United States Patent [19]
Liu

[11] Patent Number: 6,104,584
[45] Date of Patent: Aug. 15, 2000

[54] VOLTAGE FEEDBACK INRUSH CURRENT LIMIT CIRCUIT HAVING INCREASED TOLERANCE FOR COMPONENT VALUE VARIATION

[75] Inventor: Rui Liu, Plano, Tex.

[73] Assignee: Lucent Technologies, Inc., Murray Hill, N.J.

[21] Appl. No.: 09/250,938

[22] Filed: Feb. 18, 1999

[51] Int. Cl.[7] .................................................... H02H 7/00
[52] U.S. Cl. ............................. 361/18; 361/58; 361/93.9; 361/111; 323/908
[58] Field of Search .............................. 361/18, 58, 93.9, 361/111; 323/908; 363/50, 56

[56] References Cited

U.S. PATENT DOCUMENTS

| | | | |
|---|---|---|---|
| 5,574,632 | 11/1996 | Pansier | 363/49 |
| 5,619,127 | 4/1997 | Warizaya | 323/275 |
| 5,886,431 | 3/1999 | Rutigliano | 307/131 |
| 5,991,175 | 11/1999 | Liu | 363/56 |

*Primary Examiner*—Michael Sherry

[57] ABSTRACT

The present invention provides a protection circuit for, and method of, sensing a transient condition and limiting a current, and a power supply having a filter incorporating the protection circuit or method. In one embodiment, the protection circuit includes: (1) a current-limiting component coupled between the filter and a return node, (2) a bypass switch coupled across the current-limiting component, (3) a load-current return switch series-coupled between an output of the power supply and the return node and (4) a control circuit that senses a transient condition in the power supply and controls at least one of the bypass switch and the load-current return switch.

21 Claims, 2 Drawing Sheets

VOLTAGE FEEDBACK INRUSH CURRENT LIMIT CIRCUIT HAVING INCREASED TOLERANCE FOR COMPONENT VALUE VARIATION

TECHNICAL FIELD OF THE INVENTION

The present invention is directed, in general, to a power supply and, more specifically, to an inrush current limit circuit for a power supply having an increased tolerance for variations in component values therein.

BACKGROUND OF THE INVENTION

Power supply systems are required to operate reliably over a broad range of conditions. These conditions include variations in both input voltages and output load demands. When several power supplies are operated in parallel and derive their power from a single input voltage source, the addition or deletion of one or more of the power supplies may induce a temporary excursion in the input voltage. Additionally, as the output load demands change abruptly on one or more of the paralleled power supplies, the new condition may cause the corresponding voltage operating conditions associated with that power supply to also change temporarily. Also, a fault condition may develop in one or more of the power supplies that requires permanent isolation of those power supplies to protect the others, until the fault is corrected. Each of these situations has the potential to create a transient condition.

Another transient condition occurs when a power supply is first turned on. When the power supply is connected to an input voltage source, the filter capacitors in the power supply are charged. The initial current that flows into the power supply may be quite large compared to the current that the power supply normally accommodates. This temporary "inrush" current must be handled in a manner that prevents damage from occurring to the components of the power supply. Additionally, it is desirable that the inrush current be accommodated in a way that does not affect the overall operating efficiency of the power supply when operating in a steady-state or non-transient mode.

Circuits that limit the magnitude of an inrush current often comprise both passive and active components. Each of these components has a nominal value or set of characteristics that describe the component. Additionally, each component typically has a tolerance stated for its value or characteristic, normally given as a percentage range. The component tolerances are normally selected to assure that the power supply performs correctly during steady-state operation. However, since the inrush current may be large compared to normal operating currents, the component tolerances may allow too large a magnitude range for the inrush current. This causes component damage, unless the critical components are either over-designed or hand-selected. This tends to raise the cost associated with protecting the power supply.

Accordingly, what is needed in the art is a way to minimize the effect of component tolerances on the magnitude of inrush current without affecting overall power supply efficiency.

SUMMARY OF THE INVENTION

To address the above-discussed deficiencies of the prior art, the present invention provides a protection circuit for, and method of, sensing a transient condition and limiting a current and a power supply having a filter incorporating the protection circuit or method. In one embodiment, the protection circuit includes: (1) a current-limiting component coupled between the filter and a return node; (2) a bypass switch coupled across the current-limiting component; (3) a load-current return switch, which is series-coupled between an output of the power supply and the return node and (4) a control circuit that senses a transient condition in the power supply and controls at least one of the bypass switch and the load-current return switch.

The control circuit enables the current-limiting component to limit an inrush current through the local bus during a presence of the transient condition. Conversely, the control circuit enables the power supply output to provide power to a load during an absence of the transient condition, thereby increasing an efficiency of the power supply.

The present invention therefore introduces the broad concept of limiting a selected current and isolating a load-current return in the power supply based on sensing the presence of a transient condition. The control circuit coordinates these activities to provide overall protection to the power supply during a transient condition.

In one embodiment of the present invention, the control circuit includes a current-limiting component that is a fusible resistor. Of course, other current-limiting components may be selected that allow tailoring of the current limiting response to meet special situations.

In one embodiment of the present invention, the transient condition is caused by a fault in the power supply load. These fault conditions may be generated by temporarily changing load demands, or they may be the result of more permanent conditions due to circuit or equipment failure.

In one embodiment of the present invention, the control circuit comprises a resistor network coupled across an input of the power supply and an isolation control switch coupled to a node in the resistor network. In an embodiment to be illustrated and described the isolation control switch is a MOSFET.

In one embodiment of the present invention, the bypass switch is a MOSFET. Alternately, the bypass switch may a diode. Of course, other types of switches may be used.

In one embodiment of the present invention, the power supply has a diode and a fuse coupled to the local bus, which provide a measure of isolation between power supplies common to local bus.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
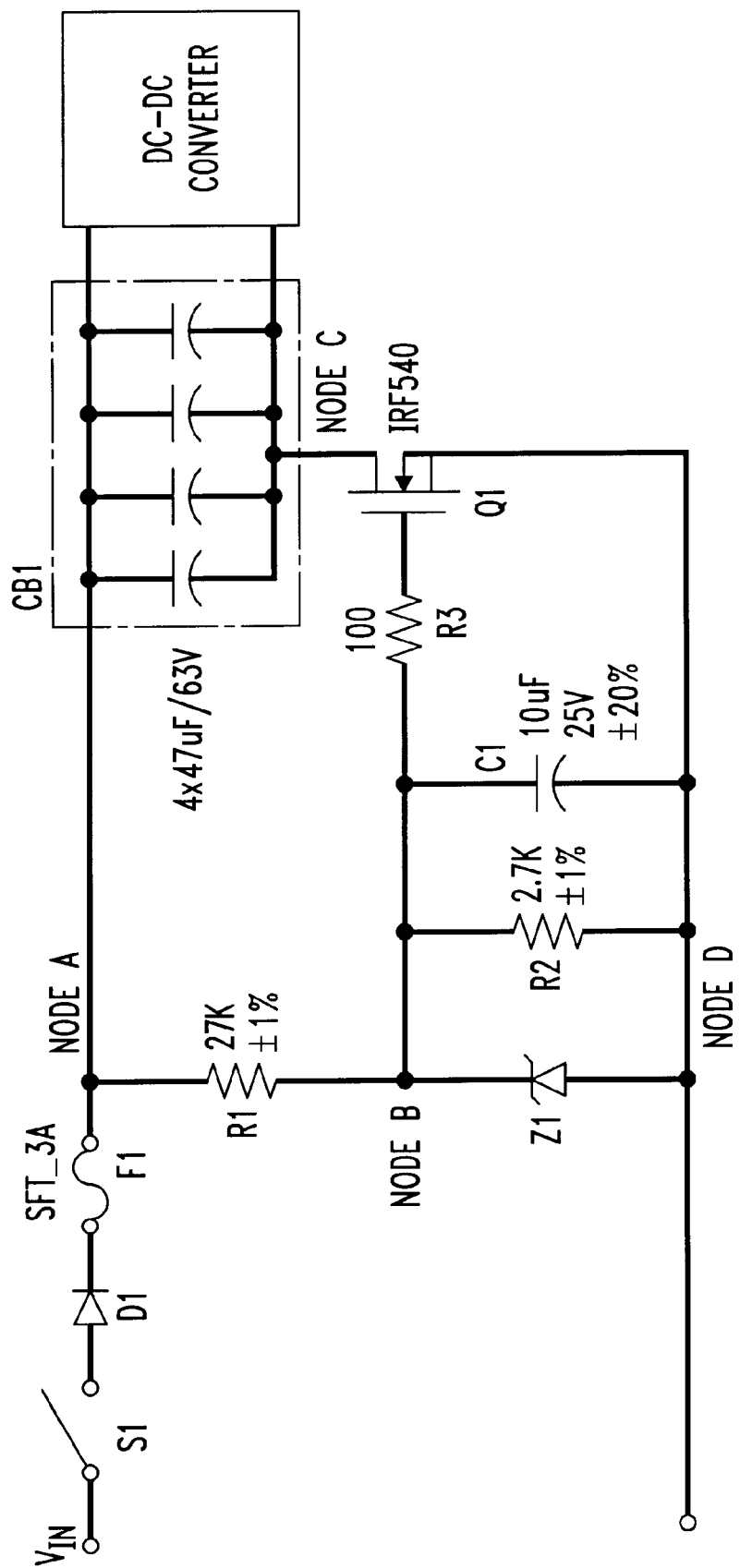
FIG. 1 illustrates a diagram of a prior art inrush current limiting circuit, where the magnitude of an inrush current is subject to a plurality of component tolerances.

Referring initially to FIG. 1, illustrated is a diagram of a prior art inrush current limiting circuit 100, where the magnitude of an inrush current is subject to a plurality of component tolerances. The inrush current limiting circuit 100 includes an input switch S1, an isolation diode D1, a fuse F1, a capacitor bank CB1, a DC—DC converter DC1, first, second and third resistors R1, R2, R3, a capacitor C1, a zener diode Z1 and a transistor Q1.

The input switch S1 is used to connect the local bus at node A to an input or source bus providing an input voltage Vin as a source of DC voltage as shown. The isolation diode D1 isolates the local bus at node A from a temporary decrease in the input voltage Vin. Conversely, the fuse F1 isolates the input bus from a fault condition that causes a current supplied by the local bus to increase beyond an allowed value for an extended period of time. The capacitor bank CB1 provides filtering and the DC—DC converter DC1 functions as an output load for the local bus.

At the instant that the input switch S1 closes, the voltage at node A is usually zero volts, and the voltage across the capacitor bank CB1 is also zero volts. The input voltage Vin provides a DC voltage that is typically between 48 and 58 volts. Application of the input voltage Vin to the node A causes the voltage at a node B to increase at a rate determined by a time constant circuit R1R2C1 formed by the actual values of the parallel combination of the first resistor R1 and the second resistor R2 along with the capacitor C1.

The current flowing through the time constant circuit R1R2C1 is typically small and the final voltage at the node B is determined by the zener voltage of the zener diode Z1. At some point, the voltage at node B reaches a value (typically between two volts and four volts) that causes the transistor Q1 to conduct, thereby allowing the inrush current to flow through the capacitor bank CB1 and the transistor Q1 to the return line shown as a node D.

The initial magnitude of the inrush current is determined by the actual values of several components, which represent only one set of a range of possible values due to the component tolerances. A minimum tolerance value for the time constant circuit R1R2C1 in conjunction with the minimum conduction voltage of two volts for the transistor Q1 combines to allow a maximum value of inrush current (about six amperes for this case). Conversely, another set of components may combine to provide a maximum tolerance value for the time constant circuit R1R2C1 in conjunction with the maximum conduction value of four volts for the transistor Q1 combines to allow a minimum value of inrush current (about three amperes).

The inrush current is seen to have a possible magnitude range of two to one due to component tolerances. This forces a selection of the transistor Q1 to accommodate the maximum value of inrush current, thereby increasing both its power requirement and component cost. Additionally, the transistor Q1 is required to accommodate any magnitude of fault current that may occur in the load until the fuse F1 opens. In the event of an output short circuit, the transistor Q1 may easily fail before the fuse F1 opens.

Figure 2:
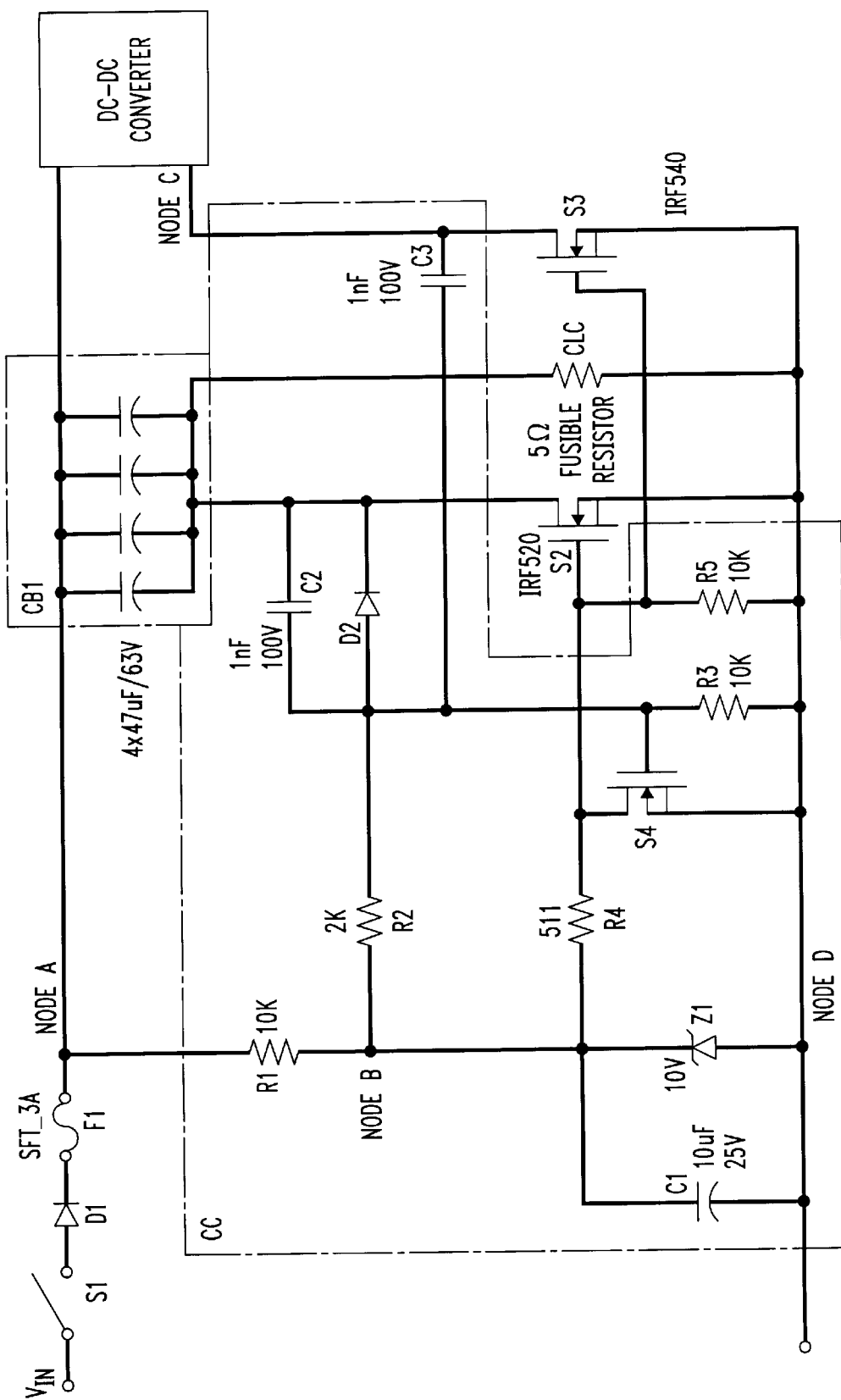
FIG. 2 illustrates a diagram of an embodiment of the current invention showing a protection circuit providing voltage feedback inrush current limiting having a minimized component tolerance effect.

Turning now to FIG. 2, illustrated is a diagram of an embodiment of the current invention showing a protection circuit 200 providing voltage feedback inrush current limiting having a minimized component tolerance effect. The protection circuit 200 includes an input switch S1, an isolation diode D1, a fuse F1, a capacitor bank CB1 and a DC—DC converter DC1. Further, the protection circuit 200 includes a current-limiting component CLC, a bypass switch S2, a load-current return switch S3 and a control circuit CC. The control circuit CC includes an isolation control switch S4, a first, second, third, fourth and fifth resistor R1, R2, R3, R4, R5, a first, second and third capacitor C1, C2, C3, a pull-down diode D2 and a zener diode Z1.

The embodiment of the present invention presented in FIG. 2 introduces the broad concept of sensing the presence of a transient condition and limiting an inrush current based on a component that may be specifically tailored. The current-limiting component CLC is coupled between the filter bank CB1 and the node D and serves to limit the inrush current to a predetermined maximum value. The current-limiting component CLC is shown to be a fusible resistor in FIG. 2. of course, other current-limiting components may be selected that allow tailoring of the current limiting response to meet special situations. The bypass switch S2, which serves to increase the overall efficiency of the power supply, is coupled across the current-limiting component CLC and closes during an absence of the transient condition. The bypass switch S2 is shown to be a MOSFET. As shown alternately in FIG. 2, the bypass switch S2 may also be a diode. The load-current return switch S3 is series-coupled between an output of the power supply and the node D and is shown to be a MOSFET. Of course, other types of switches may be used as appropriate.

The control circuit CC senses the transient condition in the power supply and controls the bypass switch S2 and the load-current return switch S3. The control circuit CC includes a resistor network coupled across an input of the power supply and the isolation control switch S4 coupled to the node B in the resistor network. The control circuit CC enables the current-limiting component CLC to limit an inrush current through the local bus during a presence of the transient condition. Conversely, the control circuit CC enables the power supply output to efficiently provide power to a load during an absence of the transient condition. The control circuit CC thereby coordinates the functioning of the bypass switch S2 and the load-current return switch S3 to provide overall protection to the power supply during the transient condition.

As previously described, the function of the input switch S1 is to connect the local bus at a node A to an input bus providing an input voltage Vin as a source of DC voltage. The isolation diode D1 isolates the local bus at the node A from a temporary decrease in the input voltage Vin. Conversely, the fuse F1 isolates the input bus from a fault condition that causes an excessive current to flow through the local bus. The capacitor bank CB1 provides filtering and the DC—DC converter DC1 functions as an output load for the local bus.

As before, at the instant that the input switch S1 closes, the voltage at the node A is usually zero volts, and the voltage across the capacitor bank CB1 is also zero volts. The input voltage Vin provides a DC voltage that is typically between 48 and 58 volts. Application of the input voltage Vin to the node A causes the voltage at the node B to increase until the zener diode Z1 conducts. The first capacitor C1 provides filtering and smoothing at the node B. The isolation control switch S4 is initially closed by this action, which causes the bypass switch S2 and the load-current return switch S3 to be open. With the bypass switch S2 open, the current-limiting component is placed in series with the capacitor bank CB1 and serves to limit the inrush current. Additionally, the node D is isolated from the output load.

The magnitude of the inrush current diminishes as the capacitor bank CB1 becomes charged (due to the inrush current) When the inrush current has diminished to an acceptable level, the voltage across the current-limiting component CLC has dropped to a level that causes the pull-down diode D2 to conduct, thereby allowing the isolation control switch S4 to open. The second capacitor C2 provides a small amount of smoothing at this point. The isolation-control switch S4 being open then causes the bypass switch S2 and the load-current return switch S3 to close indicating an absence of the transient condition. Closing of the bypass switch S2 provides efficient power supply operation. Closing of the load-current return switch S3 connects the current return at the node D to a node C at the power supply load, thereby allowing load current to return.

The control circuit CC then monitors the local bus at node A and the load-current return at the node C for the presence of a transient condition, which may be generated by a fault condition. The presence of a potentially damaging transient condition is detected either by the voltage at the node A (coupled through the capacitor bank CB1) or the voltage at the node C increasing by an amount sufficient to cause the isolation control switch S4 to again close. These potentially damaging transient conditions are transmitted through the second capacitor C2 and the third capacitor C3 respectively. This action causes the bypass switch S2 and the current-return switch S3 to open until an absence of the transient condition is again detected or the fuse F1 opens thereby protecting the power supply.

In summary, the embodiment of the present invention illustrated in FIG. 2 provides a control capability in the form of a circuit that detects the presence of a transient condition in a power supply and introduces a component to limit the transient current to a maximum value. The current-limiting capability is dependent on a single component, in this embodiment, whose value and tolerance may be selected to provide the necessary maximum current. Additionally, the load is isolated from the current return during the presence of the transient condition, thereby protecting a load current switch that may otherwise be subject to excessive current and failure.

From the above, it is apparent that the present invention provides a protection circuit for, and method of, sensing a transient condition and limiting a current, and a power supply having a filter incorporating the protection circuit or method. In one embodiment, the protection circuit includes: (1) a current-limiting component coupled between the filter and a return node, (2) a bypass switch coupled across the current-limiting component, (3) a load-current return switch series-coupled between an output of the power supply and the return node and (4) a control circuit that senses a transient condition in the power supply and controls at least one of the bypass switch and the load-current return switch.

Although the present invention has been described in detail, those skilled in the art should understand that they can make various changes, substitutions and alterations herein without departing from the spirit and scope of the invention in its broadest form.

What is claimed is:

1. For use with a power supply having a filter coupled to a local bus, a protection circuit comprising:
   a current-limiting component coupled between said filter and a return node;
   a bypass switch coupled across said current-limiting component;
   a load-current return switch series-coupled between an output of said power supply and said return node; and
   a control circuit that senses a transient condition in said power supply and controls at least one of said bypass switch and said load-current return switch to (a) enable said current-limiting component to limit an inrush current through said local bus during a presence of said transient condition and (b) increase an efficiency of said power supply and enable said output to provide power to a load during an absence of said transient condition.

2. The protection circuit as recited in claim 1 wherein said current-limiting component is a fusible resistor.

3. The protection circuit as recited in claim 1 wherein a fault in said load causes said transient condition.

4. The protection circuit as recited in claim 1 wherein said control circuit comprises a resistor network coupled across an input of said power supply and an isolation control switch coupled to a node in said resistor network.

5. The protection circuit as recited in claim 4 wherein said isolation control switch is a MOSFET.

6. The protection circuit as recited in claim 1 wherein said bypass switch is selected from the group consisting of:
   a MOSFET, and
   a diode.

7. The protection circuit as recited in claim 1 wherein said power supply further has a diode and a fuse coupled to said local bus.

8. A method of protecting a power supply having a filter coupled to a local bus, comprising:
   sensing a transient condition in said power supply;
   enabling a current-limiting component coupled between said filter and a return node to limit an inrush current through said local bus during a presence of said transient condition; and
   controlling a bypass switch coupled across said current-limiting component and a load-current return switch series-coupled between an output of said power supply and said return node to increase an efficiency of said power supply and enable said output to provide power to a load during an absence of said transient condition.

9. The method as recited in claim 8 wherein said current-limiting component is a fusible resistor.

10. The method as recited in claim 8 wherein a fault in said load causes said transient condition.

11. The method as recited in claim 8 wherein said control circuit comprises a resistor network coupled across an input of said power supply and an isolation control switch coupled to a node in said resistor network.

12. The method as recited in claim 11 wherein said isolation control switch is a MOSFET.

13. The method as recited in claim 8 wherein said bypass switch is selected from the group consisting of:
   a MOSFET, and
   a diode.

14. The method as recited in claim 8 wherein said power supply further has a diode and a fuse coupled to said local bus.

15. A power supply, comprising:
   a local bus;
   a fuse coupled to said local bus;
   a filter coupled to said local bus; and
   a protection circuit, including:
      a current-limiting component coupled between said filter and a return node,
      a bypass switch coupled across said current-limiting component,
      a load-current return switch series-coupled between an output of said power supply and said return node, and a control circuit that senses a transient condition in said power supply and controls at least one of said bypass switch and said load-current return switch to (a) enable said current-limiting component to limit an inrush current through said local bus and protect said load-current return switch during a presence of said transient condition and (b) increase an efficiency of said power supply and enable said output to provide power to a load during an absence of said transient condition.

16. The power supply as recited in claim 15 wherein said current-limiting component is a fusible resistor.

17. The power supply as recited in claim 15 wherein a fault in said load causes said transient condition.

18. The power supply as recited in claim 15 wherein said control circuit comprises a resistor network coupled across an input of said power supply and an isolation control switch coupled to a node in said resistor network.

19. The power supply as recited in claim 18 wherein said isolation control switch is a MOSFET.

20. The power supply as recited in claim 15 wherein said bypass switch is selected from the group consisting of:

a MOSFET, and a diode.

21. The power supply as recited in claim 15 wherein said power supply further has a diode coupled to said local bus.

* * * * *